Nov. 11, 1924.
W. DREDGE
BISCUIT MAKING APPARATUS
Filed July 21, 1924
1,515,098
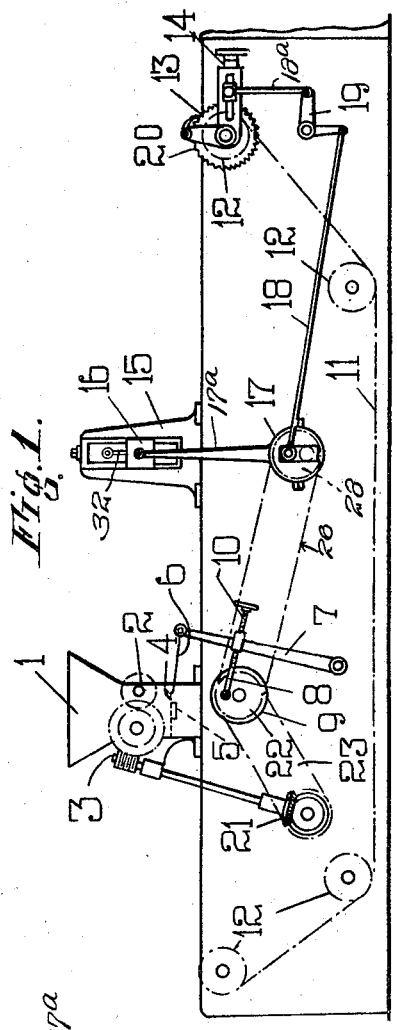
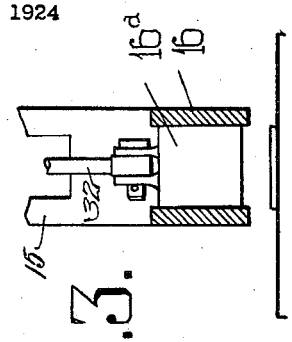
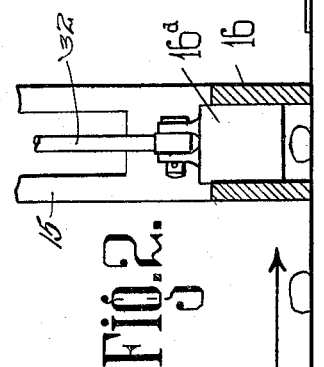
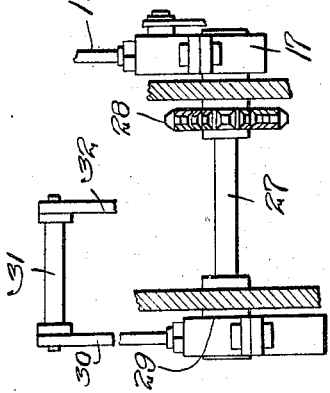
Inventor:
William Dredge Patented Nov. 11, 1924.

1,515,098

UNITED STATES PATENT OFFICE.

WILLIAM DREDGE, OF MANCHESTER, ENGLAND.

BISCUIT-MAKING APPARATUS.

Application filed July 21, 1924. Serial No. 727,348.

*To all whom it may concern:*

Be it known that I, WILLIAM DREDGE, a subject of the King of Great Britain, residing in Manchester, in the county of Lancaster and Kingdom of England, have invented certain new and useful Improvements Relating to Biscuit-Making Apparatus, of which the following is a specification.

This invention relates to the manufacture of biscuits and the like and apparatus therefor.

In making biscuits in the ordinary way the dough is rolled out into sheets, and as the biscuits are cut out from these sheets large quantities of scrap are left. This scrap has to be rolled out into further sheets, from which more biscuits are cut. The frequent rolling of this scrap causes deterioration in the quality of the goods, and one of the objects of my invention is to avoid the formation of this scrap.

The present invention has for its object a method of and apparatus for making biscuits or the like in which each biscuit or the like is formed from a separate piece of dough, which is pressed or moulded into the desired shape by a plunger operating within a movable mould that encloses the piece of dough, and is also embossed at the same time with a design if desired. To this end, in the manufacture of biscuits or the like according to my invention, pieces of dough of the required size and weight, produced by any well-known or suitable means, are conveyed to a machine for shaping them to the required shape, and also embossing them, if desired, said shaping and embossing machine having a movable mould, formed by an annular or other suitably shaped wall, and an inner plunger independently movable within said mould, the mould and plunger co-operating in such manner that the dough-piece to be shaped or moulded is first surrounded and enclosed by the mould moving over it, and shaping or moulding and embossing is then effected by the subsequent movement of the die or plunger within the mould while the latter remains at rest, whereby the dough is pressed to the required shape to form a biscuit or the like within the mould, and also at the same time embossed. An intermittently operating endless conveyor, the rest period of which synchronizes with the operation of the shaping and embossing machine, is used for automatically conveying the dough pieces to the shaping and embossing machine and thence onward to the panning mechanism.

The dough is fed into a hopper, or other dough-container suitable for my purpose, from which dough-container the dough is delivered to means for producing and delivering the required pieces. I combine with the hopper, or other dough-container any well-known device, such as a dough-divider or a wire cut off depositor or any other machine that will divide and deliver the pieces singly, or any number of pieces at a time, or in single rows, or any number of rows, to provide the pieces for the shaper and embosser as aforesaid. After their delivery from the divider or wire-cut-off depositor the pieces pass on to a suitable endless conveyor and are automatically conveyed to the shaper and embosser referred to.

I may elect to do the shaping and embossing in single pieces, or any number of pieces simultaneously, or in a single row or any number of rows.

The invention will be further described with reference to the accompanying drawing, in which:

Figure 1 diagrammatically illustrates the apparatus for the manufacture of biscuits and the like in accordance with my invention.

Figures 2 and 3 illustrate the shaping and embossing devices in two different positions.

Fig. 4 is a side view showing the mechanism for operating the shaping and embossing devices.

In the drawing, 1 is a dough-hopper, at the bottom of which are located rollers 2, preferably corrugated, and driven by worm gearing 3. The dough after passing through the rollers 2 is forced through a die-plate 4 having apertures therein corresponding to the size of the dough pieces 5 to be delivered and the dough pieces are cut off by a knife or a wire-cutter 6, operated by a lever 7 actuated by a crank-pin 8 on a crank-disc 9. Adjusting means 10 are provided for regulating the cutting. This wire cut mechanism is of known type. The die-plate and cutter may of course, be arranged to operate either in a horizontal or vertical position. The dough pieces must be cut of considerably less diameter than the diameter of the mould of the moulding and embossing machines.

The dough pieces produced by the divider just described drop on to an intermittently moving endless conveyor belt 11 of canvas or other suitable material. This conveyor travels over guide-rollers, such as 12, and is intermittently operated by suitable means, such as the ratchet gear 13. The adjustment of this conveyor belt according to requirements is effected by any suitable adjusting mechanism denoted by 14.

The dough pieces are conveyed by the conveyor 11 to a machine 15, which shapes and embosses them to produce biscuits ready for baking. The pieces of dough to be pressed into the desired shape and embossed are brought to rest by the stoppage of the conveyor belt in coincidence with the mould and die of the moulding and embossing machine 15. This machine 15 comprises a vertically-movable mould 16 (of annular or other suitable form according to the shape of biscuit required) that is adapted to enclose the dough-piece to be operated upon, and an inner die or plunger 16ª, independently movable up and down in the mould, which upon its descent presses upon the dough-piece in the enclosing mould and causes it to fill the space enclosed by the walls of the mould and so shapes it to the required shape, and if desired embosses it with a design. In operation, the mould 16 leads to the plunger 16ª, and first moves down to enclose the dough piece resting on the conveyor web, as shown in Fig. 2 all ready for the shaping and embossing, which is effected by the descent of the plunger 16ª. The mould 16 then moves up a small distance, to the position shown in Fig. 3 and is followed by an upward movement of the plunger, leaving the moulded dough-piece behind on the conveyor web. The pressure on the dough-piece will usually be sufficient to cause the moulded dough piece to stick to the travelling web, but in case it should stick to and be carried up by the plunger, it will be knocked off by contact with the edges of the mould.

Mould 16 in order to obtain the desired up and down movement thereof in the moulding and embossing machine is connected to an eccentric 17 by a crank 17ª. Eccentric 17 is fixed on one end of a cross-shaft 27, journalled near its ends in the frame of the apparatus, as shown in Fig. 4, shaft 27 being also provided with a sprocket wheel 28 with which engages a sprocket chain 26 for operating the various parts in the desired order. The opposite end of cross-shaft 27 carries a second eccentric 29, which through crank 30 and connecting members 31 and 32, serves to move plunger 16ª up and down at the proper time.

The eccentric 17 simultaneously actuates by the rod 18 and 18ª and bell-crank lever 19, the ratchet mechanism 20 by which the intermittent motion of the conveyor 11 is effected. The rod 18 is connected in an adjustable manner, with its operating eccentric 17.

The worm gearing 3 of the dough-hopper rollers is driven through the bevel gearing 21, provided with means for regulating its speed, and is geared by belt or chain 23 to a pulley or the like 22 that drives the crank-disc of the wire cutter or knife, and this driving mechanism of the cutter is also geared by a belt or chain 26 as shown, to the driving gear of the shaping and embossing machine 15. By these means the divider, the shaper and embosser, and the intermittently moving conveyor belt 11 are arranged to work in proper synchronism with each other, whereby the dough pieces from the divider are conveyed to and brought to rest under the moulding and embossing machine 15, which then functions whilst the conveyer belt and the divider remain inoperative. After the shaping and embossing of the biscuits is done, the latter are carried onward to the panning mechanism.

The distance between the divider and the shaping and embossing machine 15 should be adjustable to within say the distance between the rows of dough pieces.

Where the movement of the conveyor in wire-cut biscuit machines is a continuous one, as is generally the case, and as the dough is being cut in the opposite direction to the movement of the conveyor, the dough pieces are caused to turn over and therefore, the spacing of the cut-off pieces is not even, but in my machine, owing to the intermittent motion of the conveyor belt and its being arranged closer to the divider, a more even spacing of the dough pieces can be effected.

The power for driving the apparatus may be directed to any suitable shaft of the wire cut or embossing mechanism.

I declare that what I claim is:

1. An apparatus for the manufacture of biscuits and the like, formed from separate pieces of dough which are moulded into the desired shape, comprising, in combination, means for shaping the dough pieces into biscuit form, comprising a reciprocatory mould, an inner reciprocatory plunger therefor, positive operating means for said mould, and positive operating means for said plunger independent of the mould operating means; means for producing the dough pieces directly from a dough batch in condition for delivery to the shaping means; and means for conveying the dough pieces from the dough piece producing means to the shaping means.

2. An apparatus for the manufacture of biscuits and the like formed from separate pieces of dough which are moulded into the desired shape, comprising, in combination, shaping means for the dough pieces comprising a reciprocatory mould, an inner reciprocatory die therefor, positive operating means for said mould and positive operating means for said plunger independent of the mould operating means; means for producing dough pieces directly from a dough batch in condition for delivery to said shaping means; and an intermittently moving conveyor, the rest periods of which synchronize with the operations of the shaping mechanism, for automatically conveying the dough pieces from the producing means to the shaping means and then away from the shaping means.

In witness whereof, I have hereunto signed my name this 10 day of July 1924, in the presence of two subscribing witnesses.

WILLIAM DREDGE.

Witnesses:
WILLIAM HENRY SINGLETON,
JOHN A. JONES.